United States Patent [19]

Boyd, Jr. et al.

[11] Patent Number: 4,955,054

[45] Date of Patent: Sep. 4, 1990

[54] INTEGRATED TELECOMMUNICATION SYSTEM WITH IMPROVED DIGITAL VOICE RESPONSE

[75] Inventors: Ferrell W. Boyd, Jr., Clearwater; Michael Murdock, Pinellas Park; Michael McCormack, Tampa, all of Fla.; Paul Darbee, Santa Ana, Calif.

[73] Assignee: Precision Software Incorporated, Clearwater, Fla.

[21] Appl. No.: 253,470

[22] Filed: Oct. 5, 1988

[51] Int. Cl.$^5$ .................. H04M 3/50; H04Q 11/04
[52] U.S. Cl. .................................. 379/269; 370/58.3; 370/61; 370/68.1; 379/88
[58] Field of Search ............... 379/88, 89, 94, 98, 379/269, 58.3, 58.2, 68.1; 370/61, 62, 58

[56] References Cited

U.S. PATENT DOCUMENTS

| | | | |
|---|---|---|---|
| 4,627,046 | 12/1986 | Bellamy | 370/58 |
| 4,640,992 | 2/1987 | Rose | 379/89 |
| 4,656,621 | 4/1987 | Cooperman et al. | 370/59 |
| 4,719,617 | 1/1988 | Yanosy, Jr. et al. | 370/58 |
| 4,726,014 | 2/1988 | Goldman et al. | 370/58 |
| 4,747,130 | 5/1988 | Ho | 379/269 |
| 4,791,639 | 12/1988 | Afheldt et al. | 370/58 |

FOREIGN PATENT DOCUMENTS 0191992 10/1984 Japan ................. 379/269

OTHER PUBLICATIONS

"Introduction to UNIVOX", Digital Sound Corporation, Jun. 1988, Eight Pages.
"Digital Sound Corporation's VoiceServer VDS ETI", K. Oza et al., Speech Technology, Sep./Oct. 1986, Four Pages.
"VoiceServer System DSC-2000 VM, General Description", Digital Sound Corporation, Jun. 1987.
"Conversant 1 VoiceSystem: Architecture and Applications", R. Perdue et al., AT&T Technical Journal, Sep./Oct. 1986, vol. 65, No. 5, pp. 34-47.

Primary Examiner—Thomas W. Brown
Attorney, Agent, or Firm—Jim Zegeer

[57] ABSTRACT

An integrated telecommunication system for multiple telephone line response and processing having a plurality of interface circuits, each of which is adapted to control the physical connection to a plurality of telephone line channels, control communication on a group of telephone line channels connected thereto. Each interface circuit includes a high speed interface microprocessor and a first data storage associated therewith. A first bus system interconnects the plurality of interface processor circuits to signal processor circuits. Each signal processor module includes a cross-point switch and a high speed digital signal microprocessor for analyzing the incoming signals and compressing the data therein, a second data storage associated therewith, and one or more of a plurality of telecommunication function circuits controlled thereby. A multi-bus system connects each of the plurality of interface processors to each of the plurality of signal processor circuits and to a main system control processor and a third data storage. The high speed processing requirements of each group of telephone lines is performed by the respective interface control processor and a digital signal microprocessor and main system control processor selectively controls the storage of data in the first, second and third data storages and intercommunication functions between the plurality of interface processor circuits and the plurality of signal processor circuits and the function circuits controlled thereby.

5 Claims, 6 Drawing Sheets

INTEGRATED TELECOMMUNICATION SYSTEM WITH IMPROVED DIGITAL VOICE RESPONSE

BACKGROUND AND BRIEF DESCRIPTION OF THE INVENTION

The present invention relates to an integrated voice response systems for handling large numbers of telephone lines. The integrated telecommunication system provides a multiple telephone line response and processing system which provides a "soft" platform for the integration of all major aspects of the voice industry including: voice response, speaker dependent and independent voice recognition, text-to-speech and voice identification. In addition, it connects to the telephone T1 digital network such as provided by MCI, AT&T, Sprint, etc. It provides simultaneous voice and data traffic and has the ability to be configured in medium to large applications. The system disclosed herein is able to handle up to 192 lines but it is obvious that it can be configured to handle much larger systems.

The invention is comprised of several layers of processors, each with its own program and communication path. Each interface processor includes one or more T1 connection interface circuits and a control microprocessor and each digital signal processor circuit includes a cross-point switch for line data interfacing purposes and its own digital signal processor for performing signal analysis and data compression. This data is communicated to the main system control microprocessor which buffers it and signals the host system (which may be a conventional PC-AT small systems type computer) that data is present and then transfers that data to the host. Additionally, a control microprocessor in the interface circuit provides the T1 handshaking and call progress monitoring in conjunction with the interface circuit which handles the physical connections to the T1 and all its attendant traffic management.

Objects of the invention include the provision of an improved integrated telecommunications system with the ability to handle all major aspects of voice industry.

The above and other objects, advantages and features of the invention will become more apparent when considered with the following specification and accompanying drawings wherein:

FIGS. 1-4 provide in broad perspective an overview of the functional aspects of the system in which:

FIGS. 5-8 are more detailed diagrams of the system wherein:

Figure 1:
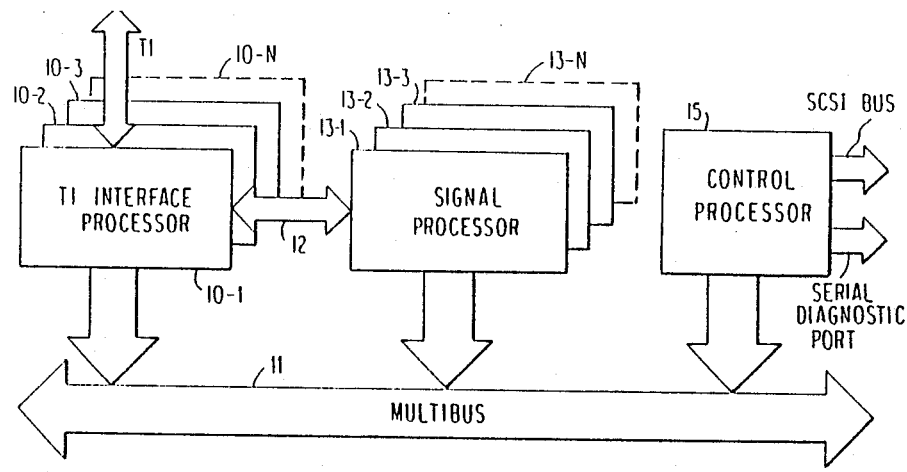
FIG. 1 is a functional block diagram of an automated multiple telephone line response and processing system incorporating the invention.
Figure 2:
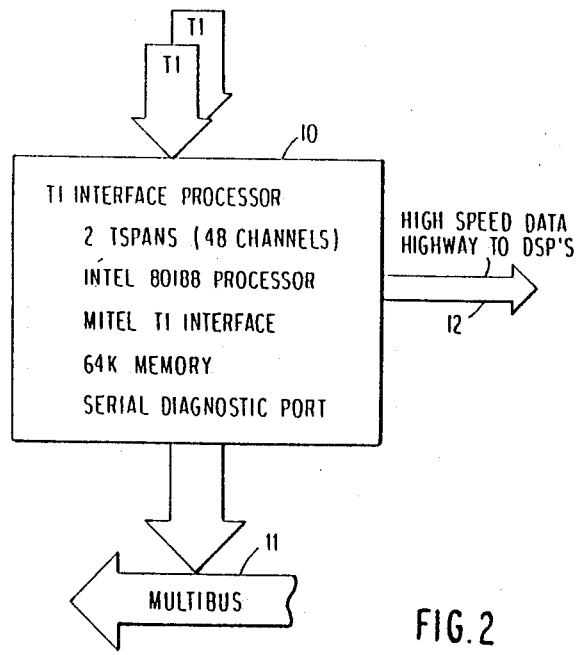
FIG. 2 is a functional block diagram of the T1 interface processor shown in FIG. 1.
Figure 3:
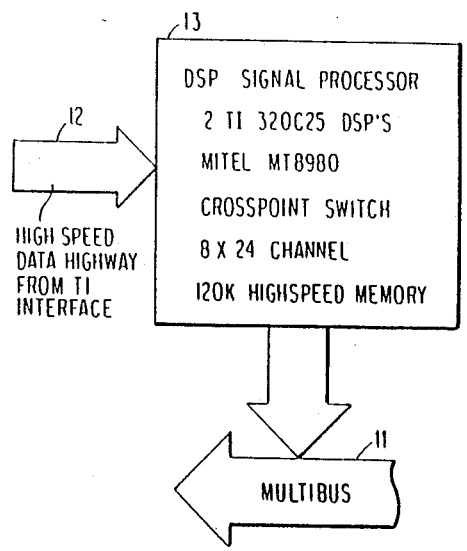
FIG. 3 is a functional block diagram of the digital signal processor shown in FIG. 1.
Figure 5:
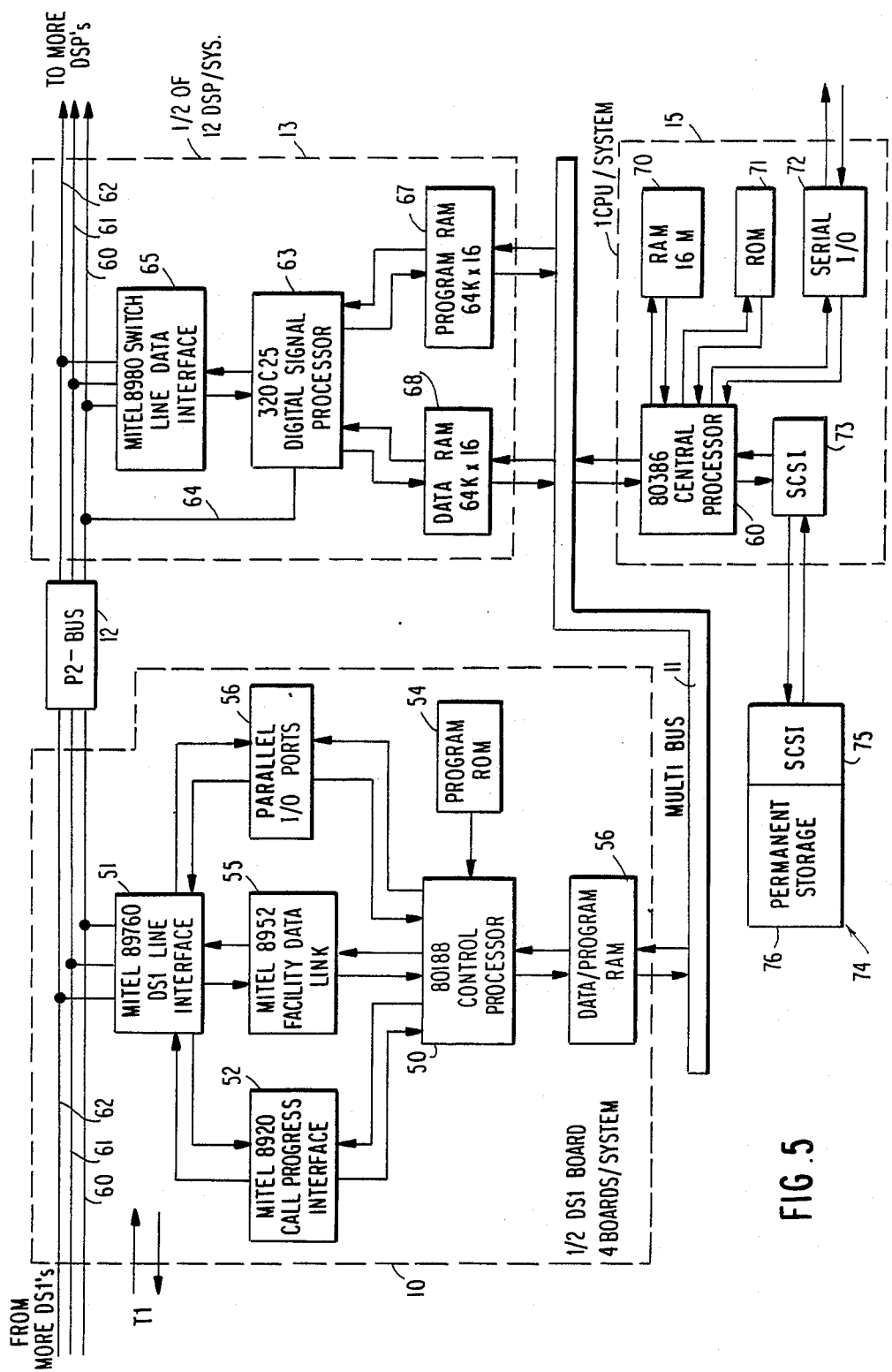
Figure 6:
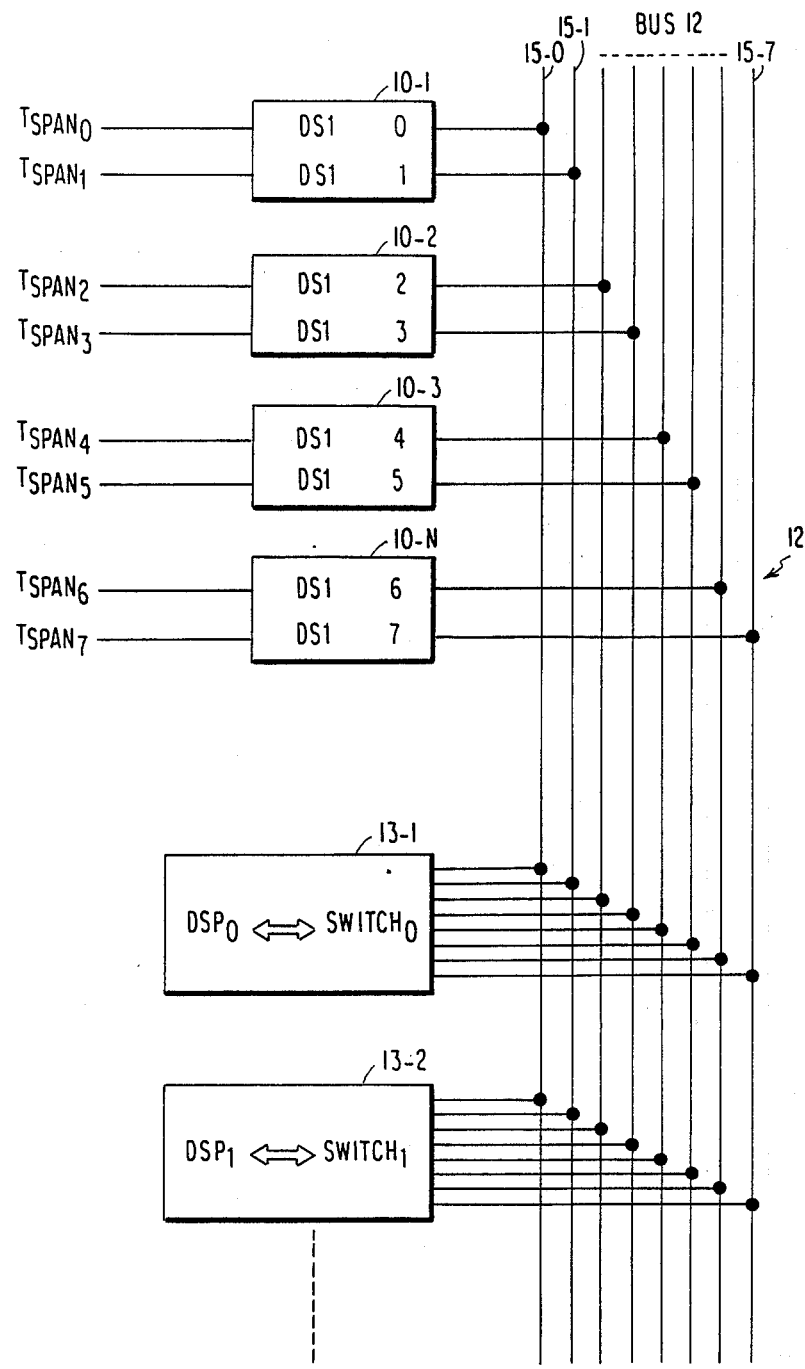
Figure 7:
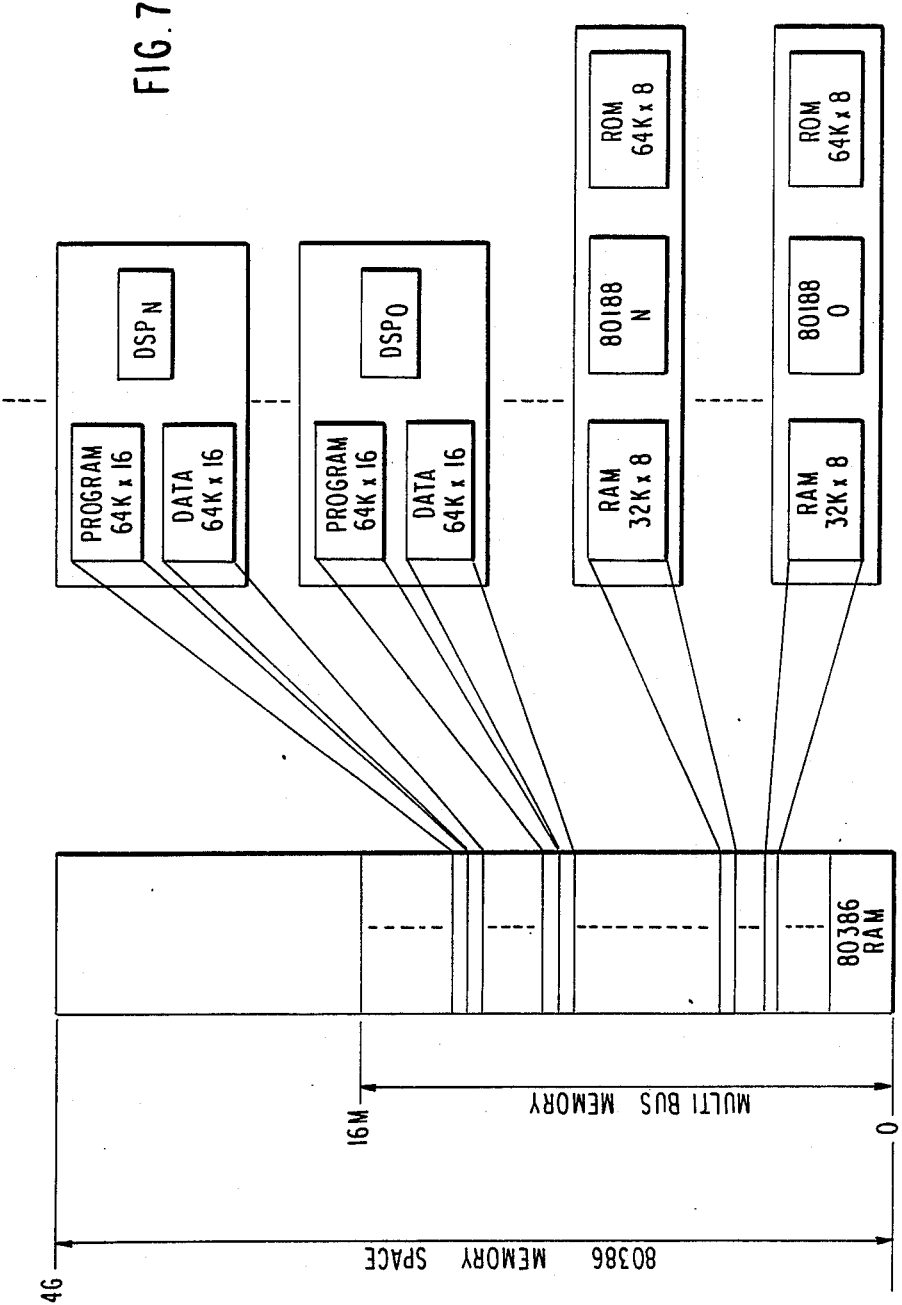
Figure 8:
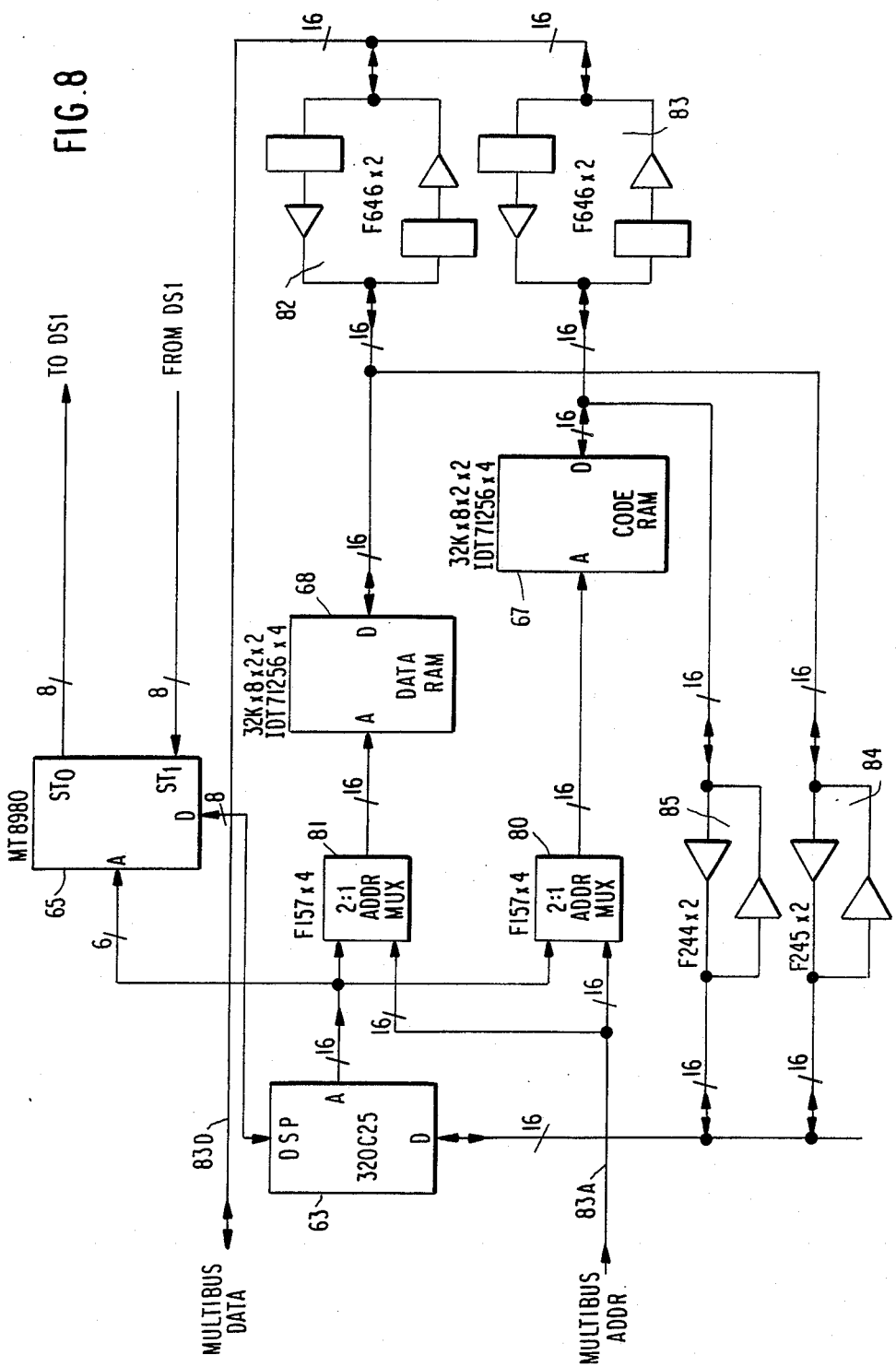

FIG. 5 corresponds to FIG. 1 and is a more detailed exposition of the overall system, FIG. 6 shows the interconnection between the digital interfacing and the digital signal processor circuitry components, FIG. 7 is a functional illustration of the system memory which is controlled by the main system microprocessor illustrating the particular location of each of these respective elements in the interface circuitry and in the digital switch circuitry and the additional memory shown in FIG. 1, and FIG. 8 is a detailed block diagram of a single digital signal processor module illustrated in FIG. 1.

DETAILED DESCRIPTION OF THE INVENTION

Referring now to FIGS. 1-4, the system in its broader aspects is adapted and designed to meet several requirements including: providing a "soft" platform for the integration of all the major aspects of the voice industry such as voice response, speaker dependent and independent voice recognition, text-to-speech and voice identification, connection to the T1 digital network, the provision of simultaneous voice and data traffic control and the ability to be configured in medium to large scale applications. It is also capable of behaving as an analog or digital switch for each T1 channel. In FIG. 1, several layers of processors each with its own program and communication paths are illustrated. Each T1 element (or T-span) constitutes multiple telephone channels or lines. (Each "T-span" coming from the phone company may be four wires or optical fiber having 24 channels (or more) encoded thereon—or 24 simultaneous conversations or data exchanges). In this embodiment there are two T-spans or T1 telephone lines, each having 24 channels so that there are 48 channels handled by each interface processor 10-1, 10-2, 10-3 . . . 10-N. Each interface processor 10 is illustrated in a functional block diagram shown in FIG. 2 and include a T1 interface microcircuit chip which in this embodiment is a Mitel 89760 (the details of which are given in the "Microelectronics Data book" published by the Mitel Corporation, copyright 1988 and incorporated herein by reference). Each processor includes a high speed microprocessor which, in this case, is an Intel 80188 (which is described in the Intel Manual) and includes 64K of random access memory for storing data and program information. This high speed microprocessor detects a phone ringing on one of the channels and signals the main system microprocessor, which, in turn, signals a particular digital signal processor module 13 to handle the call, which then signals the interface circuit that it has been assigned to handle the call and to connect the ringing channel to it for processing and responding to any signals (including voice) thereon. It also includes a serial diagnostic port.

It should be noted that the multibus for conveying address and data information between the various units is illustrated in FIG. 1 as element No. 11. At the same time, a secondary bus 12 interconnects the interface processors 10-1 and the digital signal processors 13-1, 13-2, 13-3 . . . 13-N. The bus 12 is indicated in FIG. 1 in a block form but is shown in greater detail with the various interconnections between the units shown in FIG. 6. As shown in FIG. 6, bus 12 has a plurality of lines, in this embodiment 8, which are designated as 15-1, 15-2 . . . 15-8 with the output of each interface unit 10-1 being connected to two of the lines. The different channels on each T-span which are labeled T-span 0, T-span 1, T-span 2 . . . T-span 7, each with 24 individual channels, is provided with a communication path to the T2 bus and thence to the individual digital signal processor circuits 13-1, 13-2. It should be noted that each of the digital signal processing circuits is connected to all of the lines of bus 12 so that any digital signal processing circuitry 13-1, 13-2 . . . 13-N can be used to process the signals on any of the channels of the T-spans connected to the interface circuits 10-1 . . . 10-N.

Referring again to FIG. 2, it will be noted that the bus 12 is indicated as being a high speed data highway to the digital signal processors. The functions performed by the interface processors 10 is set out in the table of functions listed on FIG. 2. The 24 channels on each of the T1 inputs typically is time division multiplexed and is demultiplexed by this processor. Each of these functions is performed by the program stored in a programmable read-only memory 54 (shown in FIG. 5) which may be in a firmware module (including installable ROM cartridges). Each of the digital signal processors 13 is shown in detail in FIG. 8 and will be described in greater detail in connection with that figure. However, it should be noted that broadly, this circuit includes the digital signal processor chips and it receives packets of data for analysis from the interface circuits 10. Each digital signal processor 13, which is multitasked, then performs the analysis and data compression on these packets of data and communicates the compressed data or the dual tone frequency modulations (DTMF) to the host computer system 74 which, in this case, may be a PC-AT computer. It signals data is present and transfers that data to the host computer system 74. Additionally, a high speed control microprocessor 63 (in the interface circuits 10 shown in FIG. 5) provides the handshaking and call progress monitoring in conjunction with the line interface circuit. The functions performed by each of the digital signal processor elements 13 are shown in the table at the right in FIG. 3.

Figure 4:
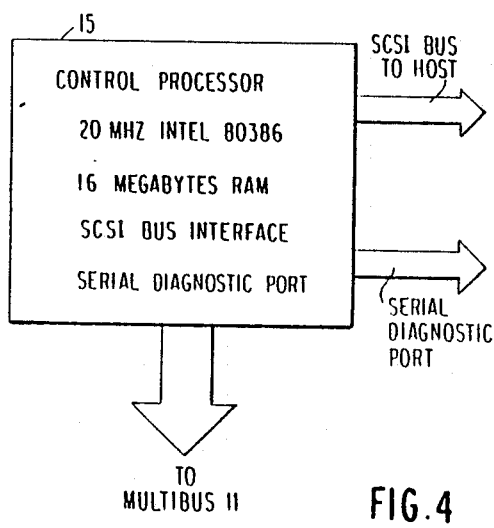
FIG. 4 is a functional block diagram of the control processor shown in FIG. 1.

The control processor 15 contains the main microprocessor 60 and is shown in detail in FIG. 5. The functional block diagram shown in FIG. 4 of the control processor illustrates a high speed (20 mHz Intell 80386) microprocessor 60 which is capable of controlling up to 16 megabytes of random access memory. These 16 megabytes of random access memory are illustrated diagrammatically in FIG. 7 where the system memory model is diagrammatically illustrated. It will be noted that each of the digital signal processors 13 has its memory indicated as being controlled by the main system control microprocessor 15, each program RAM 20 and each data RAM 21 in the digital signal processors 13 is shown as being part of the memory controlled by the main processor. At the same time, the random access memories and the ROMs in the interface units 10 are likewise illustrated as being part of the memory addressable or being controlled by the main microprocessor 60. It also addresses its own memories 70 and 71. In other words, up to 16 megabytes of memory whether physically stored in either the interface circuits 10 or the digital signal processor circuits 13 or in the host computer 74 is accessible for control by the main microprocessor CPU system 15 via the main multi-bus 11. In FIG. 4, a connection is provided for the SCSI bus to the host processor and a serial diagnostic connection to a serial diagnostic port is likewise provided for system diagnosis.

The table to the right in FIG. 4 lists the functions which are performed by the main control processor 15. These include call progress and assignment, speech data management, host system interface management, local and remote external diagnostics, automatic self-diagnostics and system wide statistics and monitoring. It will be appreciated that the read-only memory shown in FIG. 6 may contain these programs which are down-loaded upon initiating operation of the system to thereby control the operation of the central processor through these programs. Various ones of the programs may be selected or called-up from the ROM or may be separately loaded through the SCSI from the permanent storage 76.

The overall aspects of the system disclosed is to provide a soft platform for the integration of all the major aspects of the voice response system as described above. The system is comprised of several layers of microprocessors each with its own program and communication paths but each of which are controlled by a main central microprocessor 60. At the T1 connections, commercially available microprocessor chips are utilized to handle the physical connection to the T1s (the telecommunication channels) and all its attendant traffic management. It then provides the packets of data to the digital signal processor for analysis. The digital signal processor then performs signal analysis and data compression and communicates the compressed data or the DTFMs to the main system control microprocessor which buffers it and signals the host system that data is present and transfers that data to the host. Additionally, the microprocessor in the interface processor provides the telephone channel handshaking and call progress monitoring in conjunction with the interfacing provided by the microprocessor interfacing chips.

This system thus provides an effective means of distributing the high speed processing requirements of handling of the 192 channels of T1 data circuits that perform those required functions effectively while leaving the data storage and communication functions to the single main system microprocessor which can effectively address large volumes of data and manage the host interface.

Referring now to FIG. 5, a more detailed system block diagram is shown in which the interface processors 10, digital signal processors 13 and main control processor system 15 are shown in their interrelated arrangements with the preferred microelectronic circuit chips with their manufacturer identified (e.g., Mitel 89760, is a Mitel circuit component for interfacing to a T1 telephone channel and is described, for example, in detail beginning at pages 4–263 through 4–288 of the Mitel "Microelectronics Data Book" issue No. 5, copyright 1988 by the Mitel Corporation and which is incorporated herein by reference). The coupling of the individual telephone line channels to the Mitel circuit element is conventional and is illustrated at page 4–286 of said Mitel Manual and hence need not be shown in detail herein.

As described above, the control microprocessor 50 (an Intel 80188) is responsible for the control and monitoring of the line interface controller 51 (a Mitel 89760) and the associated circuitry. Specifically, it handles the SF or ESF bit oriented AB signalling per channel; the FDL UI frame for performance reporting; the ISDN D-channel signalling layer 2 and layer 3; the multi-bus interface for communications to the main central processor 60 in system central processing unit 15 and it does the initialization and diagnostic testing functions for this unit.

The call progress interface unit 52 (a Mitel 8920) is coupled to the DS1 line interface unit 51 and is controlled by control microprocessor 50. Control microprocessor 50 is initially loaded with its program from read-only memory 54. The line interface element 51 is also coupled to the facility data link 55 (a Mitel 8952 unit) conventionally serves as the facility data link controller. Finally, the line interface unit 51 is also coupled via the parallel input/output port 56 which are likewise controlled by the high speed control processor 50. The coupling between multi-bus 11 and the high speed control processor 50 in the interface circuitry is buffered by a random access memory 56 which stores both data and program which is coupled to and from the central processor microprocessor 60 via the multi-bus 11.

The bus 12 is generally indicated as having three lines but it will be appreciated that these are multi-lines for inputs/outputs and the third line is a synchronizing line. Thus, in the digital signal processor 13, line 60 is a synchronizing line and lines 61 and 62 can constitute input lines and output lines, respectively. Synchronizing line 60 is connected to synchronize the operation of high speed microprocessor 63 (an Intel 30C25 unit) by synchronizing line 64.

A cross-point switch 65 (which is shown and described in greater detail in relation to FIG. 8), is controlled by high speed microprocessor 63 and supplies digital signals to a data random access memory 66 and program random access memory 67 which, as described earlier herein, are controlled by the main central processor 60. The high speed digital signal processor 63 is programmed for analyzing and encoding and decoding functions on data passed to it from the interface circuitry 10 in the main central microprocessor 15. Each of these circuits 13 is responsible for processing six channels of the T1 telephone circuits with a compliment of four digital signal processors 13 required to process all 24 channels of the telephone line component T1.

High speed microprocessor 63 is thus responsible to handle communications of data to and from the line interface system 10, the performance of ADPCM to PCM and PCM to ADPCM compression, performance of the DTMF and MF recognition, performance of the DTMF and MF tone generation, data buffer management, watch dog functions, call progress monitoring, system housekeeping functions and the performance of channel management functions. All of these functions are achieved under program control which is received from the central processor by the program RAM 67.

The main central processing unit 15 is illustrated as having central processor 60, a random access memory 70, a read-only memory 71 (which may be in a firmware module including installable ROM cartridges), a serial input/output port 72 and a small computer systems interface (SCSI) 73 which couples to a host system 74 which may include a further small computer systems interface 75, large or mass permanent storage 76 (for record or archival purposes) and the small host computer (PC-AT) referred to earlier. Main central processor 60 includes programs for performing supervisory control functions over the digital signal processors and the interface circuitry 10 and its high speed microprocessor 50 and communications to the host system 74 and the memory management functions (as noted earlier, all of the different memory elements identified herein are controllable from the central microprocessor 60), serial communications to a debugger/monitor and watch dog functions. Specifically, this central microprocessor manages interactions between the two high speed microprocessors 50 and 63 via buses 11 and 12 and the host system 74 (via the SCSI bus). It also manages its local memory, loading phrases from the host PC 74, transferring recorded speech to the host PC and determining where in memory to store this data. It also manages the message queue to and from the host computer 74 driver. Moreover, it handles management of call progress data from the two high speed microprocessors 50 and 63 and it handles call assignment when the high speed microprocessor 50 signals an incoming call by assigning it to a particular high speed computer 63 in the bank of digital signal processors 13-1, 13-2 ... 13-N. It monitors (e.g., provides "watch dog" functions) of the status of each channel and "wakes up" locked up channels or takes them out of service. In addition, it is programmed to handle the physical control of the SCSI interface 73 with the SCSI driver. It also can handle universal asynchronous receive/transmit (UART) communications with the front panel and processes instructions from the host computer 74 (e.g., send DTMF, record in minutes, play a phrase, etc.). The host computer 74 can provide functional control over the entire system because it down loads parameter information at start up and communicates individual instructions.

Referring now to FIG. 8, a detail circuit diagram of a single digital signal processing module incorporating the invention is illustrated. Each of the individual interconnecting lines in FIG. 8 has a number with a slash beside it which indicates the number of lines or channels of information. Cross point switch 65 is used to provide 8-line byte 32 channel inputs to the digital signal processor 13 and connect to bus 12. Digital signal processor circuitry 13 has four modules, each one of which includes of its own code memory 67, data memory 68, cross point switch 65 and high speed microprocessor 63. The inputs to the code memory 67 and data memory 68 are controlled by address multiplexers 80 and 81, respectively, which receive inputs from the high speed microprocessor 63 and the multi-bus address lines 83A. High speed microprocessor 63 is a TI TMS 320C25 chip which has an execution cycle time of 120NS in order to fit in a dual port memory without bus arbitration. It has a 16-bit external bus (indicated) with a 32-bit internal bus (not shown), a 544 word data random access memory with a capability of accessing 64K words of data memory and 64K words of code memory and it has a 16-bit multiplier and a serial port timer. The data memory 68 is a dual port memory and the main central processor 60 (FIG. 5) can down load data to the data memory 68 and set a flag in the memory to signal the high speed memory 63 the completion of the data transfer. The first half of the 120NS cycle is allocated for the data memory access and the second half of the cycle is used by the main microprocessor 60. In this way, the bus contention problems will never occur and consequently, no bus arbitration is required. As an example, four 32K×8 RAM chips with 35NS access and cycle time may be used. The total 64K 16-bit word data memory is thus provided.

The digital signal processor code memory 67 is also a dual port memory. However, the data in this case can only be loaded by the main central microprocessor 60 when the high speed memory 63 is in halt and thus it is assumed that the code memory 67 need only be loaded during initialization. A total of 64K 16-bit word code memory is thus provided. Data flow from the multi-bus data lines 83D to the data random access memory 68 is via conventional data coupling circuits 82 (the designations are shown for this exemplary embodiment) and to the code random access 67 via data coupling circuit 83D, both of which are illustrated as back-to-back bi-directional couplers, there being one such circuit for each of the individual 16 lines shown. Moreover, the high speed microprocessor 63 monitors the operation of these units via conventional data coupling units 84 and 85 (their chip designations are F244X2) which buffer the data and code information flow with respect to the high speed microprocessor 63.

In summary, the invention provides a soft platform for the integration of all the major aspects of the voice industry including voice response, speaker dependent and independent voice recognition, text to speech and voice identification. It also provides connection to the T1 digital network, provides simultaneous voice and data traffic with the ability to be configured in medium to large applications. It is comprised of several layers of microprocessors each with its own program and communication pass. Physical connection to the T1 telephone line and all attendant traffic management is controlled by interface controllers. The interface system provides packs of data to a digital signal processor which has its own individual high speed microprocessor for analysis. The high speed microprocessor performs the signal analysis and data compression and then communicates the compressed data to a main or central microprocessor which buffers it and signals the host system that the data is present and then transfers that data to the host. The system provides an effect means of distributing the high speed processing requirements for the handling of 92 channels of T1 telephone data to chips that perform the required functions effectively while leaving the data storage and communication functions to a single central microprocessor which can effectively address large volumes of data and manage the SCSI interface.

While there has been shown and described a preferred embodiment of the invention, it will be appreciated that various modifications and adaptations of the invention will become readily apparent to those skilled in the art and it is intended that such obvious modifications and adaptations be encompassed within the claims appended hereto.

What is claimed is:

1. An integrated telecommunication system for multiple telephone line response and processing comprising:
   a plurality of interface processor circuits, each of which is adapted to control the physical connection to a plurality of telephone line channels and control communication on a group of said telephone line channels connected thereto. each said interface circuit including a high speed interface control microprocessor and a first data storage associated therewith,
   a plurality of signal processor circuit means, each said signal processor circuit means including crosspoint switch means for receiving multiple line mutiple channel inputs and producing corresponding multiple line multiple channel outputs, and a high speed digital signal microprocessor for analyzing the incoming signals and compressing the data therein, and a second data storage associated therewith, for controlling one or more telecommunication function circuits,
   a main system control microprocessor,
   a first bus system for connecting said plurality of interface processor circuits to said plurality of signal processor circuit means, and
   a second bus system for connecting each of said plurality of interface processor circuits to each of said plurality of signal processor circuit means and to said main system control microprocessor,
   whereby the high speed processing requirements of each said group of telephone lines is performed by said interface processor circuits and said digital signal microprocessor and said main system control microprocessor controls the storage of data in said first and second data storages and intercommunication functions between said plurality of interface processor circuits and said plurality of signal processor circuit means and said one or more telecommunication function circuits controlled thereby.

2. The integrated telecommunication system defined in claim 1 wherein each of said plurality of interface processor circuits includes a telephone line interface circuit chip, a call progress interface chip and a facility data link chip and means connecting said interface circuit chip, call progress interface chip and said facility data link chip to said high speed interface control microprocessor, and means to supply a program to said high speed interface control microprocessor.

3. The integrated telecommunication system defined in claim 1 including a permanent data storage means and means connecting said permanent data storage means to said main system control microprocessor.

4. An integrated telecommunication system for multiple telephone line response and processing comprising:
   a plurality of interface processor circuits, each of which is adapted to control the physical connection to a plurality of telephone line channels, and control communication on a group of said telephone line channels connected thereto, and each interface processor circuit including a high speed interface control microprocessor, respectively,
   a plurality of signal processor circuit means, each said signal processor circuit means including crosspoint switch means for receiving multiple line multiple channel inputs and producing corresponding multiple line multiple channel outputs, and a high speed digital signal microprocessor for analyzing the incoming signals and compressing the data therein, and one or more telecommunication function circuit means controlled thereby,
   a main system control microprocessor, and data storage means connected thereto,
   a first bus system for connecting said plurality of interface processor circuits to said plurality of signal processor circuit means, and
   a second bus system for connecting each of said plurality of interface processor circuits to each of said plurality of signal processor circuit means and to said main system control microprocessor,
   whereby the high speed processing requirements of said group of telephone line channels is performed by said interface processor circuits and said digital signal microprocessor and said main system control microprocessor controls the storage of data in said data storage means and intercommunication functions between said plurality of interface processor circuits and said plurality of signal processor circuit means and said telecommunication function circuit means controlled thereby.

5. The integrated telecommunication system defined in claim 4 wherein each of said plurality of interface processor circuits includes a telephone line interface circuit chip, a call progress interface chip and a facility data link chip and means connecting said interface circuit chip, call progress interface chip and said facility data link chip to said high speed interface control microprocessor, and means to supply a program to said high speed interface control microprocessor.

* * * * *